US011678744B2

(12) United States Patent
Semple

(10) Patent No.: US 11,678,744 B2
(45) Date of Patent: Jun. 20, 2023

(54) MOUNTING METHOD AND APPARATUS

(71) Applicant: Norcros Group (Holdings) Limited, Hampshire (GB)

(72) Inventor: Luke Michael Ritchie Semple, Andover (GB)

(73) Assignee: Norcros Group (Holdings) Limited, Hampshire (GB)

( * ) Notice: Subject to any disclaimer, the term of this patent is extended or adjusted under 35 U.S.C. 154(b) by 36 days.

(21) Appl. No.: 17/051,802

(22) PCT Filed: Apr. 18, 2019

(86) PCT No.: PCT/GB2019/051112
§ 371 (c)(1),
(2) Date: Oct. 30, 2020

(87) PCT Pub. No.: WO2019/211577
PCT Pub. Date: Nov. 7, 2019

(65) Prior Publication Data
US 2021/0235866 A1   Aug. 5, 2021

(30) Foreign Application Priority Data

Apr. 30, 2018   (GB) .................................. 1807052.4

(51) Int. Cl.
*A47B 95/00*   (2006.01)
(52) U.S. Cl.
CPC .................................. *A47B 95/008* (2013.01)
(58) Field of Classification Search
CPC ....... A47B 95/00; A47B 95/008; F16B 37/14; F16B 37/145

USPC ......................................................... 312/245
See application file for complete search history.

(56) References Cited

U.S. PATENT DOCUMENTS

| | | | | |
|---|---|---|---|---|
| 2,951,668 A | * | 9/1960 | Peterka | A47G 1/215 248/488 |
| 3,487,446 A | * | 12/1969 | Hero et al. | A47B 95/008 248/222.41 |
| 3,791,709 A | * | 2/1974 | Cross | A47B 95/008 248/300 |
| 4,124,189 A | * | 11/1978 | Einhorn | A47G 1/20 248/304 |
| 4,136,598 A | | 1/1979 | Hughes | |

(Continued)

FOREIGN PATENT DOCUMENTS

| | | |
|---|---|---|
| GB | 603268 A | 6/1948 |
| GB | 2427119 A | 12/2006 |
| JP | 2013194888 A | 9/2013 |

OTHER PUBLICATIONS

International Search Report dated May 24, 2019; International Application No. PCT/GB2019/051112.

*Primary Examiner* — Jonathan Liu
*Assistant Examiner* — Guang H Guan
(74) *Attorney, Agent, or Firm* — Dinsmore & Shohl LLP

(57) ABSTRACT

A method of and/or apparatus for mounting a furniture unit on a substantially vertical surface, such as a wall, includes establishing a first mount, with the furniture unit supported on the mount while level is established, and a second mount is then fixed in place. The first and second mounts are vertically spaced so that the unit can rest, under gravity, in a stable manner while level is established and the second mount is fixed in place.

12 Claims, 2 Drawing Sheets

(56) References Cited

U.S. PATENT DOCUMENTS

| | | | | |
|---|---|---|---|---|
| 4,507,884 A | * | 4/1985 | Kazanjian | A47G 1/06 40/716 |
| 4,683,670 A | * | 8/1987 | Bates | G09F 7/02 40/620 |
| 4,701,089 A | * | 10/1987 | Nettel | B25B 13/54 411/404 |
| 5,181,817 A | | 1/1993 | Anderson | |
| 5,893,544 A | | 4/1999 | Chen | |
| 5,997,229 A | * | 12/1999 | Akers | F16B 37/14 411/372.5 |
| 7,540,456 B2 | * | 6/2009 | Thompson | A47G 1/175 248/220.21 |
| 8,051,690 B2 | * | 11/2011 | Camisasca | F16B 41/00 70/229 |
| 8,210,785 B1 | * | 7/2012 | Gager | E03D 11/16 411/338 |
| 8,671,545 B1 | * | 3/2014 | Zimmerman | A47H 1/142 211/16 |
| 9,283,904 B2 | * | 3/2016 | Parenti | F16B 21/12 |
| 10,246,866 B2 | * | 4/2019 | Junca | F16B 33/006 |
| 10,329,008 B2 | * | 6/2019 | Walker | B64F 5/10 |
| 2004/0056167 A1 | * | 3/2004 | Vogt | A47G 1/164 248/475.1 |
| 2014/0238947 A1 | | 8/2014 | Hao | |
| 2021/0235866 A1 | * | 8/2021 | Semple | A47B 95/008 |

\* cited by examiner

MOUNTING METHOD AND APPARATUS

CROSS-REFERENCE TO RELATED APPLICATIONS

This application is the U.S. national stage of PCT/GB2019/051112 filed Apr. 18, 2019, which claims priority of United Kingdom patent application 1807052.4 filed Apr. 30, 2018, both of which are hereby incorporated by reference in their entirety.

FIELD OF THE INVENTION

This invention provides a method of and/or apparatus for mounting items of furniture on a vertical surface such as a wall. In this context furniture includes items such as cupboards and shelves but may also include (but not be limited to) items such as mirrors and works of art.

BACKGROUND TO THE INVENTION

It is well known to mount a furniture item on a wall using devices which not only provide vertical support but which also include some form of adjustment to enable the furniture device to be levelled. One such arrangement is described in our British Patent No. 2 427 119. The apparatus described in this patent functions well but is bulky, relatively costly to manufacture and further, if the item is to sit flush against the wall, a rebated surface on the rear of the item is required to accommodate the mounting components.

Some of the problems described above are addressed by the mounting apparatus described in our British Patent No. 2 498 380 which uses horizontally spaced connectors that include adjusters to establish or correct level once the two connectors have been fixed in place. The connectors include cam adjusters to fine-tune level, approximate level needing to be established before the connector bases are fitted to the wall. Further, when mounting a furniture item via mounting holes pre-formed in the item, the spacing between the connectors needs to be established before the connector bases are fixed to the wall and the item must be supported at all times until both connectors are fixed in place.

It is an object of the invention to provide a method and apparatus which will go at least some way in addressing the drawbacks mentioned above; or which will at least provide a novel and useful alternative.

SUMMARY OF THE INVENTION

Accordingly, in one aspect, the invention provides a method of mounting an item of furniture on a substantially vertical surface, said item of furniture having a mounting structure, said method including the steps of:
fixing a first mount to said substantially vertical surface;
engaging said mounting structure with said first mount such that said item of furniture is supported thereby;
levelling said item of furniture while supported by said first mount;
fixing a second mount to said substantially vertical surface at a position vertically spaced from said first mount; and
fixing the position of said item of furniture relative to said substantially vertical surface by applying at least one fixing means extending between one of said mounts and said mounting structure, said at least one fixing means being configured to apply a bias to said mounting structure in a direction toward said substantially vertical surface.

Preferably said method comprises applying a first fixing means between said first mount and said mounting structure, and applying a second fixing means between said second mount and said mounting structure, each of said first and second fixing means being configured to apply a bias to said mounting structure in a direction toward said substantially vertical surface.

Preferably said method comprises supporting said item of furniture on said first mount under gravity.

Preferably said mounting structure comprises a substantially planar back-board forming part of said item of furniture, mounting apertures being provided in said back-board, said method comprising passing said first and second mounts through said apertures.

Preferably said method comprises passing said first mount through an aperture above an aperture for said second mount.

Preferably said first and second fixing means comprise caps configured to overlie said first and second mounting apertures, said method comprising engaging said caps with said first and second mounts.

Preferably said method comprises engaging said caps with said first and second mounts in a manner that provides a progressive bias to said mounting structure in the direction of said substantially vertical surface.

Preferably said method comprises screw-fitting said caps to said first and second mounts.

In a second aspect the invention provides apparatus for fixing an item of furniture to a substantially vertical surface, said item of furniture having a mounting structure, said apparatus including a first mount configured to, in use, fix to said substantially vertical surface and engage with said mounting structure to support said item of furniture with respect to said substantially vertical surface; a second mount configured to, in use, fix to said substantially vertical surface at a position vertically spaced from said first mount; and at least one fixing means configured to, in use, extend between one of said mounts and said mounting structure and operable to apply a bias to said mounting structure in a direction toward said substantially vertical surface.

Preferably said apparatus includes a first fixing means configured to, in use, extend between said first mount and said mounting structure; and a second fixing means configured to, in use, extend between said second mount and said mounting structure, said first and second fixing means being operable to apply a bias to said mounting structure in a direction toward said substantially vertical surface.

Preferably said first mount and second mounts are configured to pass through first and second apertures respectively provided in said mounting structure.

Preferably said first mount has a proximal contact face for engagement, in use, with said substantially vertical surface; a distal face; and a first mount peripheral surface extending between said contact face and said distal face, said first mount peripheral surface tapering inwardly in a direction from said distal face to said contact face.

Preferably said second mount has a second periphery, at least part of which is configured to extend over and beyond a dimension of said second mounting aperture.

Preferably said second mounting aperture comprises a substantially circular hole and wherein said second mount includes a circular collar of greater diameter than a diameter of said circular hole; and wherein said second mount has a proximal contact face for engagement, in use, with said substantially vertical surface; and a distal face, an outer surface of said collar defining said distal face.

Preferably said first and second mounts each include a cavity extending inwardly from said distal faces, said cavities terminating in fixing flanges, the outer surfaces of which define said proximal contact faces; and wherein said first and second fixing means comprise caps engageable with said cavities.

Preferably each said cavity comprises a cylindrical cavity, a cylindrical surface of which is provided with a female screw thread to, in use, engage with a male screw thread on each cap.

Preferably the contact faces of said first and second mounts are provided with annular grooves configured and operable to receive O-rings.

Preferably said apparatus is configured, arranged and operable to perform the method set forth above.

Many variations in the way the invention may be performed will present themselves to those skilled in the art, upon reading the following description. The description should not be regarded as limiting but rather as an illustration, only, of one manner of performing the invention. Within the limits defined by the appended claims any element or component should be taken as including any or all equivalents thereof whether or not specifically mentioned.

BRIEF DESCRIPTION OF THE DRAWINGS

One working embodiment of the invention will now be described with reference to the accompanying drawings in which.

DETAILED DESCRIPTION OF THE INVENTION

The present invention provides a method and apparatus for mounting an item of furniture, such as shelving unit 10, to a vertical surface 11 such as a wall. As will be apparent from the description that follows, the invention allows the mounting process to be carried out simply and effectively as a one-person operation with the unit 10 preferably being supported as level is established and final fixing effected.

Figure 2:
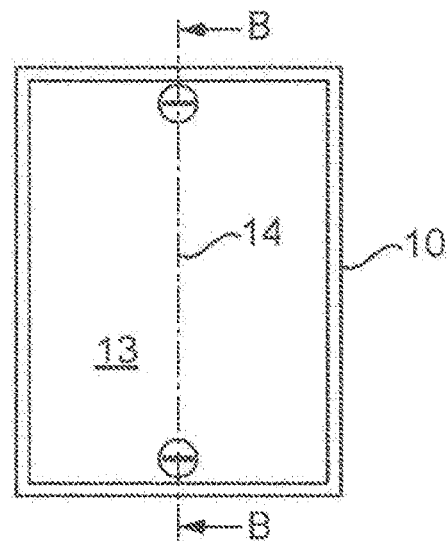
FIG. 2 is, in small scale, a front view of the item of furniture shown in FIG. 1.
Figure 3:
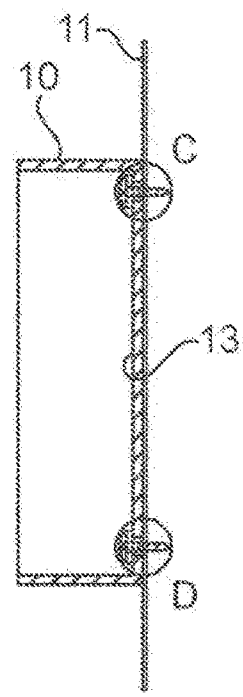
FIG. 3 is a cross-sectional view along the line B-B in FIG. 2.

In the form shown in the drawings the unit 10 has a mounting structure preferably in the form of a back board 13 having a vertical centreline 14 (FIG. 2). Conveniently provided or formed in the surface 13 is a first aperture 15 and a second aperture 16. The apertures 15 and 16 are preferably circular apertures, are spaced vertically, and are preferably spaced along the vertical centreline 14.

Figure 1:
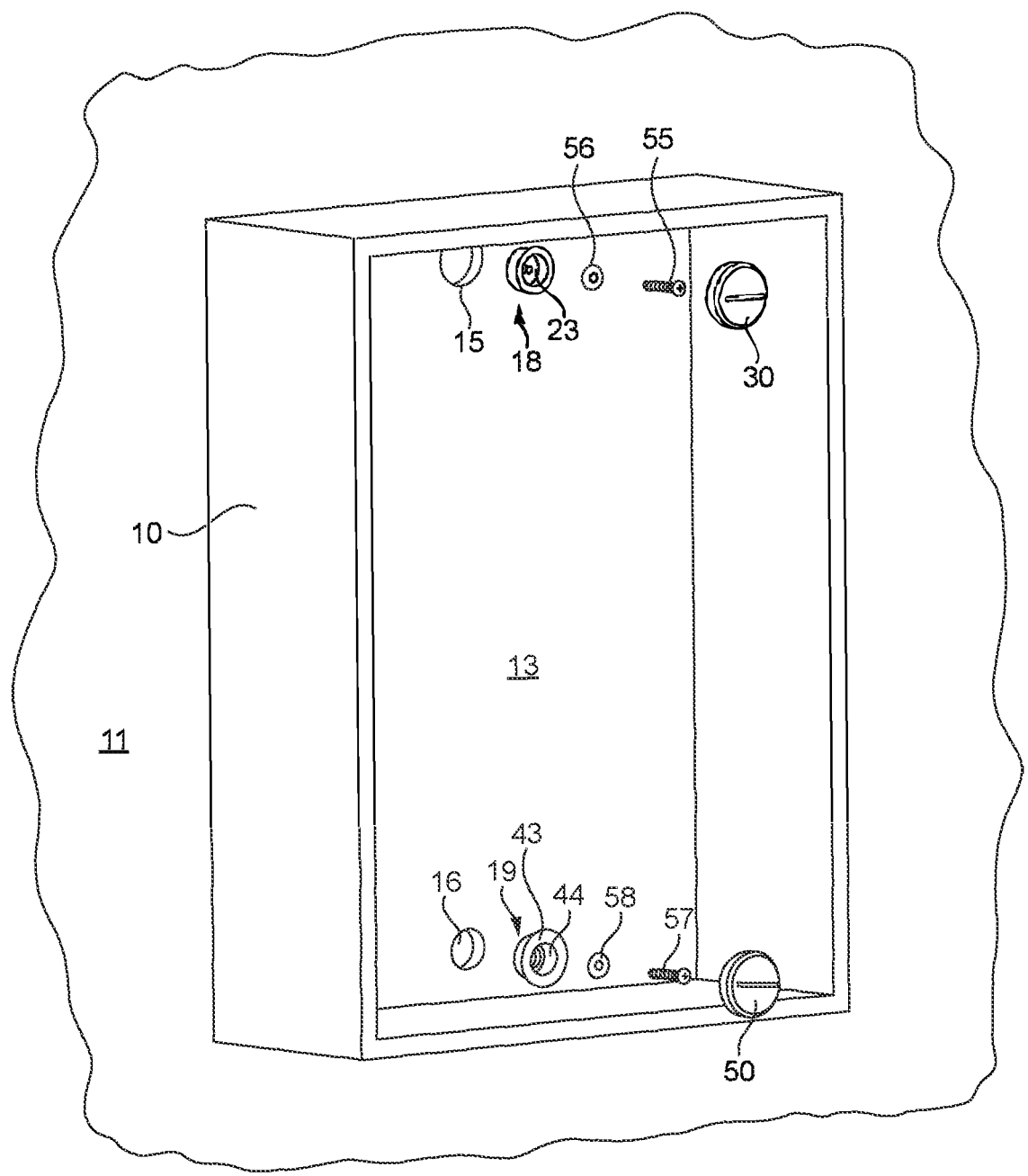
FIG. 1 is an isometric view of an item of furniture with mounting apparatus according to the invention shown in exploded form.

The mounting apparatus comprises a first mount 18 which, in use, locates in the first aperture 15 and a second mount 19 which, in use, locates in the second aperture 16. In the particular example described herein the first mount 18 has a proximal contact face 20 for engagement with the wall 11, a distal face or plane 21 and a periphery 22 joining the faces 20 and 21. As can be seen in FIG. 1, the periphery 22 is circular but, as is apparent from FIG. 4, the periphery 22 tapers inwardly from the distal face 21 to the proximal face 20. The maximum diameter of the periphery 22 is less than the diameter of the aperture 15.

Figure 4:
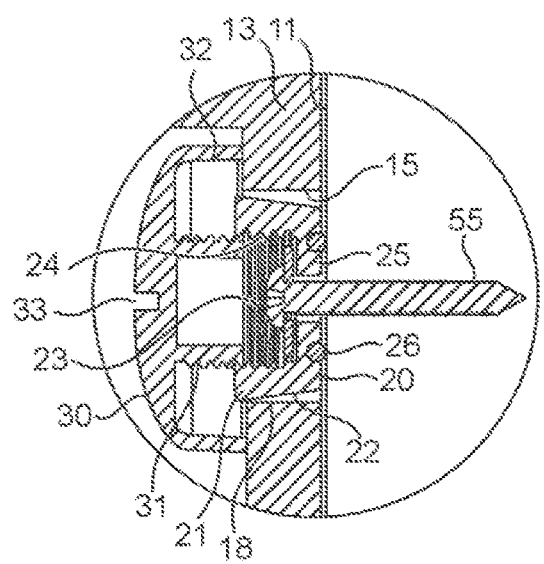
FIG. 4 is an enlarged view of the area circled C in FIG. 3.

As is again evident from FIGS. 1 and 4, the mount 18 further includes a cavity 23 extending inwardly from the distal face 21, the cavity preferably including a female thread 24 and terminating in fixing flange 25. The outer surface of the fixing flange comprises the contact face 20 which is preferably formed with an annular groove to receive an O-ring 26.

The female thread 24 in cavity 23 provides a suitable fixing for fixing means, preferably in the form of cap 30, that has a correspondingly male-threaded fixing spigot 31. The cap 30 further includes a peripheral skirt 32, the diameter of which is greater than the diameter of aperture 15 and which, when the threads 31 and 24 are engaged, can apply a bias to the surface 13 in the direction of wall surface 11. The cap 30 may include a slot 33 to facilitate the application of torque to the cap by means of a screwdriver or the like. It will be appreciated that this arrangement allows a variable degree of bias to be applied in the direction of wall 11.

Figure 5:
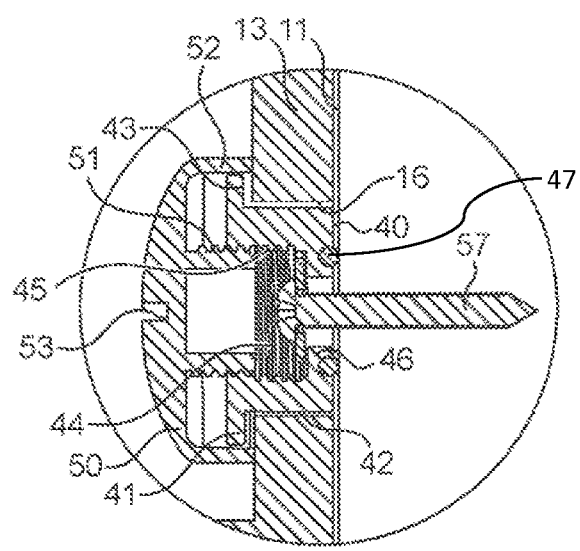
FIG. 5 is an enlarged view of the area circled D in FIG. 3.

The second mount 19 has a proximal contact face 40 for engagement with the wall 11, a distal face or plane 41 and a periphery 42 joining the faces 40 and 41. As can be seen in FIG. 1, the periphery 42 is circular but, as is apparent from FIG. 5, the periphery 42 is preferably a plain circular section, the diameter of which is just less than the diameter of second aperture 16.

An important feature of the second mount 19 is the provision of an extension, preferably in the form of collar 43, on or at the distal face 41, the diameter of the collar 43 being greater than the diameter of the second aperture 16.

As with the first mount 18, the second mount includes a cavity 44 extending inwardly from the distal face 41, the cavity preferably including a female thread 45 and terminating in fixing flange 46. The outer surface of the fixing flange comprises the contact face 40 which, like in the case of the first mount 15, is preferably formed with an annular groove to receive an O-ring 47.

As with the first mount the female thread 45 in cavity 44 provides a suitable fixing for a second fixing means, also preferably a cap 50 that has a correspondingly male-threaded fixing spigot 51. The cap 50 further includes a peripheral skirt 52, the diameter of which is greater than the diameter of aperture 16, is greater than the diameter of the collar 43 and which, when the threads 51 and 45 are engaged, can apply a bias to the surface 13 in the direction of wall surface 11. The cap 50 may include a slot 53 to facilitate the application of torque to the cap by means of a screwdriver or the like.

It will be appreciated by those skilled in the art that the apparatus are conveniently configured so that the caps 30 and 50 are identical and thus inter-changeable.

In use, furniture unit 10 may be mounted as follows:

First mount 18 is attached to the wall 11 by means of fixing screw 55 and, preferably, washer 56. Once the mount 18 is fixed in place the unit 10 can be supported on the mount by engaging aperture 15 over the mount 18. The tapered periphery 22 of the mount 18 tends to bias the unit toward the wall 11 and thus resist the unit 10 dis-engaging from the mount 18 while further elements of the mounting method are effected. As a further measure to resist dis-engagement, the cap 30 may be loosely engaged with the mount 18.

With the unit 10 supported on mount 18, level can be established, using a spirit level or the like, and then the second mount engaged through second aperture 16 and fixed in place with fixing screw 57 and, preferably, washer 58.

Caps 30 and 50 can then be tightened to bias the unit 10 firmly and securely against the wall 11.

A feature of the assembly process is that, as the mounts are displaced into contact with the wall 11, O-rings 26 and 47 create a friction between their respective mounts and the wall. This friction prevents the mounts spinning on their respective fixing screws as the caps 30 and 50 are screwed into place, or unscrewed.

While it is convenient to apply the first mount 18 shown in FIG. 4 through the first or upper aperture 15, it is possible to engage the first mount through the lower aperture 16 and complete the fixing procedure by passing the second mount through the upper aperture 15 however this would have the disadvantage that the unit is unstable and needs support until the second mount is fixed in place.

Whilst in the case of the example described the unit 10 is fixed in place by a single first mount and a single second mount, those skilled in the art will appreciate that larger units may be mounted by multiples of first and second mounts in equal or unequal numbers as required or appropriate.

It will thus be appreciated that the invention provides a simple yet effect method and apparatus for mounting an item of furniture which, at least in the case of the example described, has the advantage that the unit can be supported, levelled and fixed by one person in a sequence that does not require the unit to be removed after initial support has been established.

The invention claimed is:

1. A method of mounting an item of furniture on a substantially vertical surface, said item of furniture having a backboard and a plurality of mounting apertures formed in said backboard, at least a first mounting aperture of said plurality of mounting apertures being provided on a vertical centerline of said backboard, the method including the steps of:
   fixing a first mount to said substantially vertical surface, wherein said first mount comprises a proximal contact face for engagement, in use, with said substantially vertical surface, a distal face, and a first mount peripheral surface extending between said proximal contact face and said distal face, said first mount peripheral surface tapering inwardly in a direction from said distal face to said proximal contact face;
   engaging said first mounting aperture with said first mount such that said item of furniture is supported under gravity thereby;
   levelling said item of furniture while supported by said first mount;
   while said item of furniture is maintained level, passing a second mount through a second mounting aperture of said plurality of mounting apertures and fixing said second mount to said substantially vertical surface at a position vertically spaced from said first mount, wherein said second mounting aperture comprises a substantially circular hole, said second mount includes an annular collar of a greater diameter than a diameter of said substantially circular hole a proximal contact face for engagement in use, with said substantially vertical surface, a distal face defined by an outer surface of said annular collar, and a second periphery, wherein at least part of said second periphery is configured to extend over and beyond a dimension of said second mounting aperture; and
   fixing a position of said item of furniture relative to said substantially vertical surface by engaging at least one of a plurality of fixing means with at least one of said first and second mounts to apply a bias to said backboard in a direction toward said substantially vertical surface, said plurality of fixing means comprising:
   a first fixing means configured to, in use, engage with said first mount; and
   a second fixing means configured to, in use, engage with said second mount.

2. The method as claimed in claim 1, wherein:
   the step of engaging said at least one of said plurality of fixing means comprises engaging said first fixing means with said first mount, and engaging said second fixing means with said second mount, each of said first and second fixing means, upon engagement with a respective mount of said first and second mounts, being configured to apply a bias to said backboard in said direction toward said substantially vertical surface.

3. The method as claimed in claim 2, wherein said first fixing means comprises a first cap, said second fixing means comprises a second cap, and said first and second caps are configured to overlie said first and second mounting apertures, respectively, and wherein the step of engaging said first fixing means with said first mount comprises engaging said first cap with said first mount, and the step of engaging said second fixing means with said second mount comprises engaging said second cap with said second mount.

4. The method as claimed in claim 3, wherein the step of engaging said first cap with said first mount comprises engaging said first cap with said first mount in a manner that provides a progressive bias to said backboard toward said substantially vertical surface, and the step of engaging said second cap with said second mount comprises engaging said second cap with said second mount in a manner that provides a progressive bias to said backboard toward said substantially vertical surface.

5. The method as claimed in claim 4, wherein the step of engaging said first cap with said first mount comprises screw fitting said first cap to said first mount, and the step of engaging said second cap with said second mount comprises screw fitting said second cap to said second mount.

6. The method as claimed in claim 1, wherein said second mounting aperture is below said first mounting aperture.

7. The method as claimed in claim 1, wherein each of said first and second mounts includes a fixing flange with an outer surface defining said proximal contact face of said respective mount, each of said first and second mounts further includes a cavity extending inwardly from said distal face of said respective mount and terminating in said fixing flange of said respective mount, and said first and second fixing means comprise caps engageable with said cavities of said first and second mounts.

8. A combination of an item of furniture and an apparatus for fixing said item of furniture to a substantially vertical surface, the combination comprising:
   said item of furniture comprising:
      a backboard comprising:
         a first mounting aperture;
         a second mounting aperture comprising a substantially circular hole; and
         a vertical centerline, at least said first mounting aperture being located substantially on said vertical centerline;
   said apparatus for fixing said item of furniture to said substantially vertical surface comprising:
      a first mount comprising:
         a proximal contact face for engagement, in use, with said substantially vertical surface;
         a distal face; and a first mount peripheral surface extending between said proximal contact face and said distal face, said first mount peripheral surface tapering inwardly in a direction from said distal face to said proximal contact face, wherein said first mount is configured to, in use, fix to said substantially vertical surface and engage with said first mounting aperture to support said item of furniture with respect to said substantially vertical surface;

a second mount comprising:

a proximal contact face for engagement in use, with said substantially vertical surface;

an annular collar having a greater diameter than a diameter of said substantially circular hole;

a distal face defined by an outer surface of said annular collar; and a second periphery, at least part of which is configured to extend over and beyond a dimension of said second mounting aperture, wherein said second mount is configured to, in use, fix to said substantially vertical surface at a position vertically spaced from said first mount, and engage with said second mounting aperture in said backboard; and a plurality of fixing means comprising:

a first fixing means configured to, in use, engage with said first mount; and a second fixing means configured to, in use, engage with said second mount, each of said first and second fixing means being operable to apply a bias to said backboard in a direction toward said substantially vertical surface.

9. The combination as claimed in claim 8, wherein each of said first and second fixing means includes a cap, each of said first and second mounts includes a cavity comprising a cylindrical cavity, and a cylindrical surface of each cylindrical cavity is provided with a female screw thread to, in use, engage with a male screw thread on said cap of a respective one of said first and second fixing means.

10. The combination as claimed in claim 8, wherein said proximal contact face of said first mount and said proximal contact face of said second mount are provided with annular grooves configured and operable to receive O-rings.

11. The combination as claimed in claim 8, wherein said second mounting aperture is located substantially on said vertical centerline.

12. The combination as claimed in claim 8, wherein each of said first and second mounts includes a fixing flange with an outer surface defining said proximal contact face of said respective mount, each of said first and second mounts further includes a cavity extending inwardly from said distal face of said respective mount and terminating in said fixing flange of said respective mount, and said first and second fixing means comprise caps engageable with said cavities of said first and second mounts.

* * * * *